United States Patent
Spencer, Jr. et al.

(10) Patent No.: US 8,807,899 B2
(45) Date of Patent: Aug. 19, 2014

(54) INSERT WALL ANCHOR FOR A GRAB BAR

(75) Inventors: William H. Spencer, Jr., Burlington, NC (US); Neil Edwards, Kernersville, NC (US)

(73) Assignee: Liberty Hardware Mfg. Corp., Winston-Salem, NC (US)

( * ) Notice: Subject to any disclaimer, the term of this patent is extended or adjusted under 35 U.S.C. 154(b) by 687 days.

(21) Appl. No.: 13/036,085

(22) Filed: Feb. 28, 2011

(65) Prior Publication Data

US 2011/0150600 A1 Jun. 23, 2011

Related U.S. Application Data

(63) Continuation-in-part of application No. 12/036,369, filed on Feb. 25, 2008.

(51) Int. Cl.
*F16B 21/00* (2006.01)
*A47K 17/02* (2006.01)
*F16B 41/00* (2006.01)

(52) U.S. Cl.
CPC ............ *A47K 17/022* (2013.01); *F16B 41/002* (2013.01); *A47K 2201/025* (2013.01)
USPC ............................. 411/344; 411/85; 411/346

(58) Field of Classification Search
USPC ................. 411/84–85, 340–346; 16/436, 440
See application file for complete search history.

(56) References Cited

U.S. PATENT DOCUMENTS

| | | | | | |
|---|---|---|---|---|---|
| 450,127 | A | * | 4/1891 | Wrigley | 411/340 |
| 1,373,188 | A | * | 3/1921 | Goewey | 411/342 |
| 4,392,763 | A | * | 7/1983 | Brown | 411/342 |
| 4,616,968 | A | * | 10/1986 | Giannuzzi | 411/342 |
| 4,793,755 | A | * | 12/1988 | Brown | 411/342 |
| 4,865,501 | A | * | 9/1989 | Ferris | 411/340 |
| 5,275,518 | A | * | 1/1994 | Guenther | 411/38 |
| 6,821,069 | B2 | * | 11/2004 | Ikuta | 411/344 |
| 6,893,199 | B2 | * | 5/2005 | Michels | 411/340 |
| 7,736,108 | B1 | * | 6/2010 | Bruce et al. | 411/346 |
| 7,828,501 | B2 | * | 11/2010 | Bauer et al. | 411/344 |
| 2009/0214318 | A1 | * | 8/2009 | Bowden et al. | 411/341 |
| 2011/0150600 | A1 | * | 6/2011 | Spencer et al. | 411/341 |

* cited by examiner

*Primary Examiner* — Roberta Delisle
(74) *Attorney, Agent, or Firm* — Carlson, Gaskey & Olds, PC (57) ABSTRACT

A grab bar or other accessory is attached to a wall with at least one anchor assembly. The anchor assembly can be removed and repeatedly used as needed. The anchor assembly includes a vertical support beam, an arm having a hub portion and an arm portion, and a mounting plate that is supported by the arm. The arm portion is received within a slot formed within the vertical support beam. A spring is attached to the vertical support beam and cooperates with the arm portion to hold the arm in place during installation. The mounting plate includes a plurality of hole locations spaced radially outwardly from a center opening. The mounting plate is rotatable to position the plurality of hole locations at one of many different desired mount positions for a variety of grab bars.

27 Claims, 6 Drawing Sheets

INSERT WALL ANCHOR FOR A GRAB BAR

RELATED APPLICATION

This application is a continuation-in-part application of U.S. patent application Ser. No. 12/036,369, which was filed on Feb. 25, 2008.

TECHNICAL FIELD

This invention relates to a bar or other accessory that is utilized in bathrooms, such as a grab bar for example, and more specifically the invention relates to an insert wall anchor and a rotatable mounting plate that can provide multiple mount configurations to secure one of many different grab bars to a wall with the same insert wall anchor.

BACKGROUND OF THE INVENTION

Grab bars are utilized in bathroom applications to provide support for an individual during exit or entry in a bathtub or shower, for example. Typical grab bars include a body member that is spaced apart from, and parallel to, a wall. The grab bar has end mounts that extend toward the wall such that the grab bar can be mounted to the wall. Anchor assemblies are mounted to a wall structure that forms the shower enclosure or tub surround, and the end mounts of the grab bar are then attached to the anchor assemblies.

Behind the wall structure is a plurality of studs that extend in a vertical direction from a floor to a ceiling. Sheetrock panels are attached to the studs to form the wall structure that provides an enclosed space for a tub or shower. Tiles, fiberglass structures, etc., are then attached to the sheetrock panels to provide a waterproof tub and/or shower area with an aesthetically pleasing appearance.

One feature that requires consideration during mounting is a projection dimension. The body member of the grab bar has a wall facing side and a front facing side that is opposite the wall facing side. The projection dimension of the grab bar, i.e. a gap between the wall facing side of the body member and a wall mount surface of the enclosure, must be tightly controlled to satisfy industry standards.

The grab bars must be positioned within the tub and shower areas such that they can be easily grabbed by individuals during exit or entry, for example. When positioning the grab bars on the wall of the enclosure, it would be ideal that the anchor assemblies be able to be aligned with one of the wall studs; however this is not always possible. In some mounting configurations only one of the anchor assemblies may be aligned with a stud, or sometimes, none of the anchor assemblies can be aligned with a stud.

Traditional anchor assemblies for these mounting configurations have presented some challenges. For example, when one end of the grab bar is mounted to a stud and the other end is mounted only to sheetrock, the projection dimension can be adversely affected at one end due to height variations between the two different mounting configurations.

Further, with traditional configurations, the anchor can fall behind the wall during installation. As such, the anchor cannot be removed and re-used if needed. Additionally, different anchor configurations are needed to mount different types of grab bars.

Thus, there is a need to provide a common anchor assembly that can be used to easily mount many different types of grab bars to a wall without adversely affecting the projection dimension for grab bars having different types of mounting structure. Further, the anchor assembly should not require any special tools, and should be configured to prevent mounting components from falling behind the wall during installation, as well as overcoming the other challenges presented by traditional designs discussed above.

SUMMARY OF THE INVENTION

A grab bar or other accessory is attached to a bathroom structure, such as a wall of a shower enclosure or tub surround for example, with an anchor assembly and a mounting plate that can support many different types of grab bars.

In one example, the anchor assembly includes a vertical support beam, an arm having a hub portion and an arm portion, and a mounting plate that is coupled to the arm. The arm portion is received within a slot formed within the vertical support beam. A spring is attached to the vertical support beam and cooperates with the arm portion to hold the arm in place during installation. The mounting plate includes a plurality of hole locations spaced radially outwardly from a center opening. The mounting plate is rotatable to position the plurality of hole locations at one of many different desired mount positions for a variety of grab bars.

In one example, the mounting plate includes a tubular extension on a rear facing side. The tubular extension and hub portion of the arm are snapped together such that the mounting plate is held in place but still able to freely rotate on the hub portion.

In one example method of assembly, the mounting plate is rotated on the hub portion until the plurality of hole locations is in the desired mount position and then the grab bar or accessory is attached. This allows many different types of grab bars to be mounted to a wall using a common anchor assembly. Further, rotating the mounting plate to the desired position allows the grab bar to be positioned at any desired angle.

These and other features of the present invention can be best understood from the following specification and drawings, the following of which is a brief description.

DETAILED DESCRIPTION OF THE PREFERRED EMBODIMENT

Figure 1:
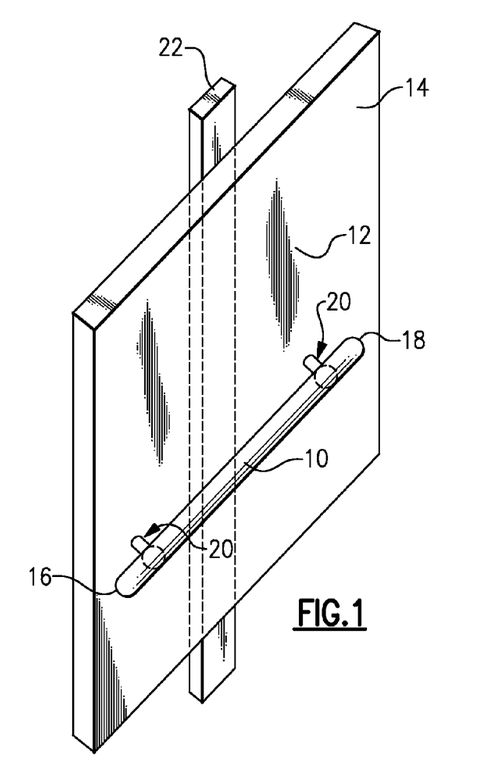
FIG. 1 is a schematic view of a wall stud, enclosure wall, grab bar, and mounting assembly.

FIG. 1 shows a grab bar 10 for attachment to a bathroom wall surface 12 of a wall structure 14, such as a tub surround/shower enclosure. The shower enclosure can be made from fiberglass or types of materials suitable for bathroom environments could also be used. The grab bar 10 extends between first 16 and second 18 ends. Mounting assemblies 20 are positioned near each of the first 16 and second 18 ends such that the grab bar 10 can be secured to the wall surface 12. In the example shown in FIG. 1, the grab bar 10 is a generally straight configuration; however, the grab bar 10 could include one or more angled portions or could have a non-linear configuration, such as an oval, triangular, or round shape for example. Further, while two mounting assemblies 20 are shown, it should be understood that a single mounting assembly could be used, or additional mounting assemblies could be used, depending upon the overall configuration of the grab bar.

In one example, the mounting assemblies 20 are not aligned with structural member spaced behind the wall structure 14, such as a wall stud 22. The mounting assemblies 20 are configured such that they can be used to secure the grab bar 10 to this "hollow" wall configuration. In some mounting configurations, one of the first 16 and second 18 ends could be aligned with the wall stud 22 while the other of the first 16 or second 18 ends is not aligned with a wall stud 22. The subject mounting assembly 20 provides an easy mount structure for a non-stud mount that does not vary a projection dimension when the grab bar 10 is installed with an opposite end being mounted to a wall stud 22.

Figure 2:
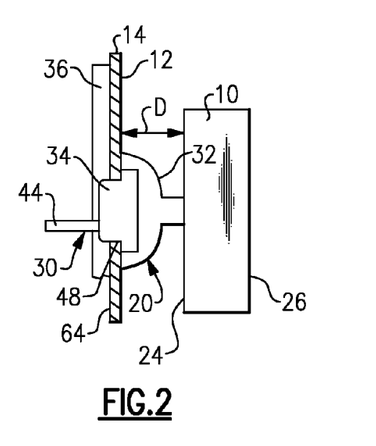
FIG. 2 is a schematic side view showing a projection dimension between an enclosure wall surface and a grab bar.

The grab bar 10 can be made from any of various types of body structures, such as hollow or solid body structures for example, and includes a wall facing side 24 (FIG. 2) and a front facing side 26 that is opposite the wall facing side 24. Each mounting assembly 20 is associated with the wall facing side 24 near the first 16 and second 18 ends as shown; however, the mounting assemblies 20 could be positioned at other locations on the grab bar body itself. When installed, the wall facing side 24 is spaced apart from the wall surface 12 by a projection dimension D as shown in FIG. 2. Industry standards require that this projection dimension D be set and maintained at a specified dimension.

Figure 3:
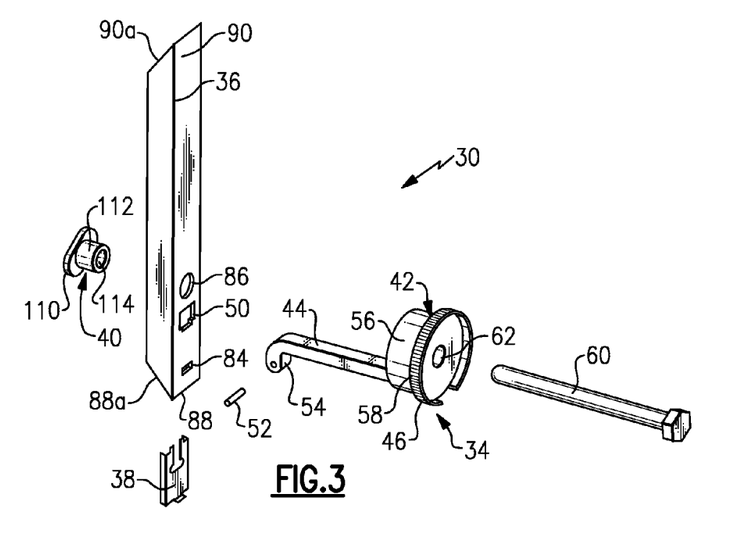
FIG. 3 is an exploded view of an anchor assembly.

The subject mounting assembly 20 includes an anchor assembly 30, shown in FIG. 3, which provides for easy, adjustable installation without special tools, in addition to providing the desired projection dimension D. The subject mounting assembly 20 also includes a base flange portion 32 that is associated with the grab bar 10 and which fits over the anchor assembly 30 as known. The anchor assembly 30 is configured such that the base flange portion 32 abuts against the wall surface 12 to maintain the projection dimension D.

In one example, the anchor assembly 30 includes a flange arm assembly 34, a vertical support beam 36, a spring 38, and a threaded insert 40. The vertical support beam 36 and flange arm assembly 34 are shown schematically in FIG. 2; and the entire anchor assembly 30 is shown in detail in FIG. 3.

The flange arm assembly 34 includes a base portion 42 that abuts against the wall surface 12 and an arm portion 44 that is received within the vertical support beam 36. In one example, the base portion 42 and the arm portion 44 are integrally formed together as a single-piece component. In one example, the single-piece component is made from a plastic material; however, other types of materials could also be used.

The base portion 42 has a flange 46 that has a diameter that is larger than a diameter of an opening 48 (FIG. 2) formed in the wall surface 12. In one example, the flange 46 is 4 mm thick and interfaces with a corresponding 4 mm bore formed within a back portion of the grab bar mount portion (not shown). By designing the grab bar to accommodate the full thickness of this flange 46, one anchor can be used, when stud mounting on an opposing end is possible, without changing the overall projection dimension D at either end.

The flange arm assembly 34 is fit through a slot 50 formed within the vertical support beam 36. In one example, the slot 50 comprises a T-shaped slot through which the arm portion 44 is inserted. A steel roll pin 52 connects the flange arm assembly 34 to the vertical support beam 36. In the example shown in FIG. 3, the arm portion 44 includes a downwardly extending distal end 54 that includes a hole for receiving the pin 52. The pin 52 prevents the arm portion 44 from being pulled out of the vertical support beam 36.

As discussed above, the flange 46 of the base portion 42 is sized such that it is larger than the opening 48 in the wall surface 12. The base portion 42 increases slightly in diameter from a forward face as the diameter approaches a mounting surface at a rear of the flange 46. This creates a slight frictional fit between the anchor assembly 30 and the grab bar 10 to ensure vertical orientation of the anchor assembly 30 during the installation phase. Directly behind the flange 46 is a reduced diameter portion 56 that closely matches the diameter of the opening 48 in the wall surface 12. The purpose of this reduced diameter portion 56 is to distribute any downward forces exerted on the grab bar 10 over as large an area as possible.

The outer peripheral surface 58 of the flange 46 comprises a knurled or textured surface. This surface facilitates rotation of the entire anchor assembly 30 when needed. This will be discussed in greater detail below.

Figure 7A:
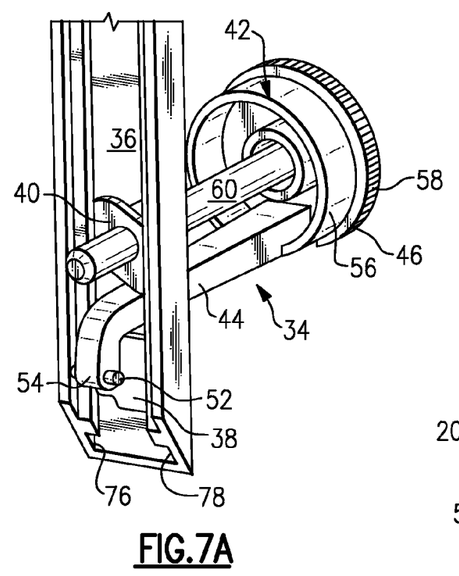
FIG. 7A is a perspective assembled view, as seen from the rear, of one example of the anchor assembly of FIG. 3.
Figure 7B:
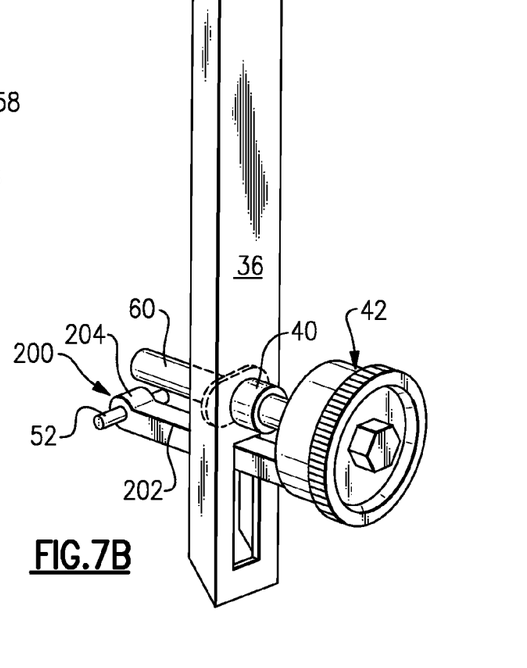
FIG. 7B is a perspective assembled view, as seen from the front, of a similar anchor assembly with another example of a flange arm assembly.

Another example of a flange arm assembly 200 is shown in FIG. 7B. Instead of providing an arm portion 44 with a downwardly extending distal end 54, the arm portion 202 is substantially straight and includes a boss 204 with a hole to receive the pin 52. The remaining portion of the flange assembly 200 is similar to that described above.

The anchor assembly 30 also includes a fastener 60 that is inserted through an opening 62 in the base portion 42 of the flange arm assembly 34, and which is threaded into the threaded insert 40. The fastener 60 cooperates with the threaded insert 40, vertical support beam 36, and flange arm assembly 34 to pull the vertical support beam 36 against a rear surface 64 (FIG. 2) of the wall structure 14. This will be discussed in greater detail below.

Figure 4:
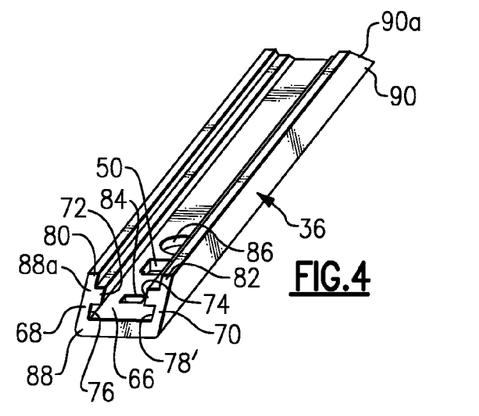
FIG. 4 is a perspective view of a vertical support beam for the anchor assembly.
Figure 5:
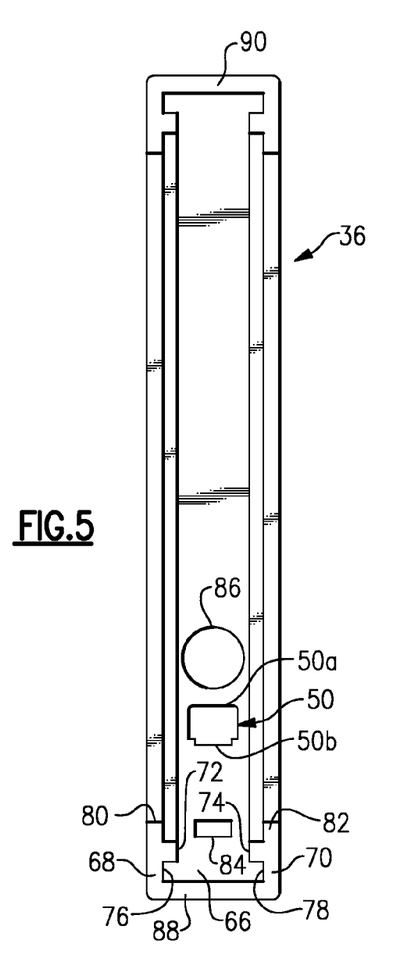
FIG. 5 is a front view of the vertical support beam of FIG. 4.

The vertical support beam 36 is shown in greater detail in FIGS. 4 and 5. In one example, the vertical support beam 36 is formed as an extruded component from a suitable aluminum material; however, other materials and forming processes could also be used. The vertical support beam 36 comprises a C-channel having a base portion 66 and first 68 and second 70 legs extending outwardly from opposing edges of the base portion 66 to form the C-shape. A first rib 72 extends inwardly from an inner wall surface of the first leg 68 and a second rib 74 extends inwardly from an inner wall surface of the second leg 70. The first 72 and second 74 ribs extend inwardly toward each other and are separated by a gap. A first groove 76 is formed between the base portion 66 and the first rib 72 and a second groove 78 is formed between the base portion 66 and the second rib 74.

A first rib or protrusion 80 is formed on an end of the first leg 68 that extends outwardly beyond the first rib 72. A second rib or protrusion 82 is formed on an end of the second leg 70 that extends outwardly beyond the second rib 74. The first 80 and second 82 protrusions extend in a direction that is generally common with the first 68 and second 70 legs. The first 80 and second 82 protrusions increase the overall strength of the vertical support beam 36 and ensure that allowable limits of the material are not exceeded under normal use.

The base portion 66 of the vertical support beam 36 includes the slot 50 that receives the arm portion 44 of the flange arm assembly 34. As shown in FIG. 5, this slot 50 has a T-shape comprising a widened portion 50a and a narrowed portion 50b. This shape facilitates insertion and retention of the arm portion 44 within the vertical support beam 36. Further, in one example, the arm portion 44 is comprised of a non-circular cross-section, which prevents the flange arm assembly 34 from being able to rotate relative to the vertical support beam 36 during installation.

The base portion 66 of the vertical support beam 36 also includes a spring slot 84 used to lock the spring 38 in place on the vertical support beam 36. In the example shown, the spring slot 84 is rectangular in shape; however, other shapes could be used.

The base portion 66 also includes an opening 86 to receive the threaded insert 40. In the example shown, the opening 86 comprises a circular opening; however, other shapes could also be used.

The vertical support beam 36 extends from a first end 88 to a second end 90. The slot 50 for the arm portion 44, the spring slot 84, and the opening 86 for the threaded insert 40 are located near the first end 88. In the example shown, the spring slot 84 is positioned on one side of the slot 50 for the arm portion 44, and the opening 86 for the threaded insert 40 is positioned on an opposite side of the slot 50.

The first 88 and second 90 ends of the vertical support beam 36 include first 88a and second 90a tapered surfaces. This minimizes the profile height of the vertical support beam 36 when it is inserted through the opening 48 in the wall surface 12. It should be understood that while tapered surfaces are shown, rounded ends or other types of reduced area end portions could also be used.

Figure 6:
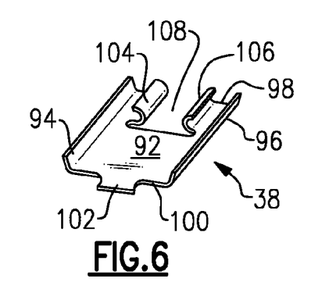
FIG. 6 is a perspective view of a spring for the anchor assembly.

The spring 38 is shown in greater detail in FIG. 6. In one example, the spring 38 is made from sheet metal; however, other suitable materials could also be used. The spring 38 comprises a generally flat spring body 92 with first 94 and second 96 upwardly turned edges or seams that extend along opposing sides of the spring body 92. The first 94 and second 96 upwardly turned edges are slidably received within the first 76 and second 78 grooves of the vertical support beam 36. An upper edge 98 extends along the spring body 92 between the first 94 and second 96 upwardly turned edges and a lower edge 100 extends along the spring body 92 between the first 94 and second 96 upwardly turned edges.

A lock tab 102 is formed along the lower edge 100. The lock tab 102 extends at an oblique angle relative to the spring body 92. The spring body 92 is slid along the first 76 and second 78 grooves until the lock tab 102 snaps into the spring slot 84 of the vertical support beam 36. This securely locks the spring 38 in position on the vertical support beam 36. The spring 38 is also held in position on an opposite end by the insertion of the threaded insert 40.

The threaded insert 40 includes a base portion 110 (FIG. 3) and a post portion 112 that extends outwardly from the base portion 110. The post portion 112 includes a threaded opening 114 that receives the fastener 60. The threaded insert 40 is installed through the open channel of the vertical support beam 36, and the post portion 112 is inserted through the opening 86. The base portion 110 is formed with a slight eccentric, i.e. the base portion 110 is non-circular. When the threaded insert 40 is installed and rotated into place, the eccentric allows the insert 40 to lock into place by engagement with wall surfaces of the grooves 76, 78 of the vertical support beam 36.

Figure 8:
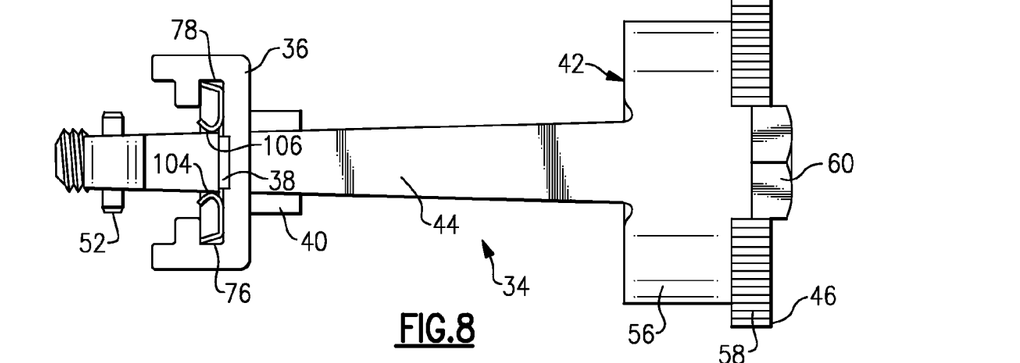
FIG. 8 is a cross-sectional view of the flange arm assembly, vertical support beam, and spring.

The spring 38 serves as a movable and re-usable retention device. This is accomplished primarily by first 104 and second 106 curved surfaces that hold the flange arm assembly 34 from movement by exerted spring pressure. A slot 108 is formed within the upper edge 98 of the spring body 92. The first 104 and second 106 curved surfaces extend along opposing edges of the slot 108, and are spaced inwardly of the first 94 and second 96 upwardly turned edges. The arm portion 44 is received within the slot 108 such that the first 104 and second 106 curved surfaces engage opposing sides of the arm portion 44 to hold the arm portion 44 in place, as shown in FIG. 8.

Installation of the anchor assembly 30 will be discussed with reference to FIGS. 7A and 7B. The flange arm assembly 34 and the spring 38 are secured to the vertical support beam 36 as described above. The post portion 112 of the threaded insert 40 is inserted into the opening 86 and is rotated until the eccentricity of the base portion 110 locks the threaded insert into place on the vertical support beam 36. Thus, an assembly of the vertical support beam 36, the spring 38, the threaded insert 40, and the flange arm assembly 34 is provided.

To install this assembly through the opening 48 in the wall surface 12, the vertical support beam 36 is orientated in a generally horizontal position with the flange arm assembly 34 lying flat against the vertical support beam 36. This flattened assembly is then pushed through the opening 48 in the wall surface 12. Once the vertical support beam 36 is fully through the opening 48, with the flange 46 of the flange arm assembly 34 located on an opposite side of the wall structure 14 from the vertical support beam 36, the vertical support beam 36 returns to a vertical orientation. The knurled surface of the flange 46 is gripped and rotated, which correspondingly rotates the entire assembly. The entire assembly is rotated until the second end 90 of the vertical support beam 36 is positioned vertically above the first end 88.

The fastener 60 is inserted through the opening 62 in the base portion 42 of the flange arm assembly 34 and is threaded into the opening 114 of the post portion 112. The threaded engagement draws the vertical support beam 36 support beam securely against the wall structure 14. Once the anchor assembly 30 is securely and properly installed, grab bar end mounts can be fit over the flange 46 and the grab bar 10 can be secured in place with set screws as known.

The subject anchor assembly 30 is configured to be non-permanent, i.e. the anchor assembly 30 can be removed and re-used as needed. This is an advantage over prior designs which had major components fall behind the wall structure once the attachment fastener and/or flange assembly was removed. Due to the use of the flange 46, which abuts against the wall surface 12, in combination with the spring 38, the anchor assembly 30 is easily removed. To remove the anchor assembly 30, the fastener 60 is removed, which allows the base portion 42 of the flange arm assembly 34 to be pulled away from the wall surface 12. This releases the spring retention pressure and allows the vertical support beam 36 to lay flat. With the vertical support beam 36 in this position, pulling the flange arm assembly 34 further forward, further collapses the assembly to reduce the profile height such that the vertical support beam 36 can follow right behind the flange arm assembly 34 through the opening 48.

Further, the flange height of the flange 46 is configured such that it is recessed behind the grab bar mount flange. As such, the anchor assembly 30 does not add any height to the overall projection of the grab bar 10, which is a significant improvement compared to prior designs.

Also, the recessed flange feature minimizes costs to the end user. The recessed flange feature allows stud mounting on one side and anchor mounting on the other side, which allows the end user to purchase only one anchor assembly. A less expensive lag screw mount can be used for the stud mounting end. With prior designs, the different mount schemes at each end resulted in different projection dimensions at each end.

Another example of an anchor assembly 200 for a grab bar or other accessory is shown in FIGS. 9-15. The anchor assembly 200 includes a vertical support beam 202, a threaded insert 260, and a spring 206 that are configured similarly to those same structures as described above. The anchor assembly 200 also includes a gasket 208, mounting plate 210, and an arm 212 that is similar to the arm shown in FIG. 3, but which does not include the knurled portion.

Figure 9:
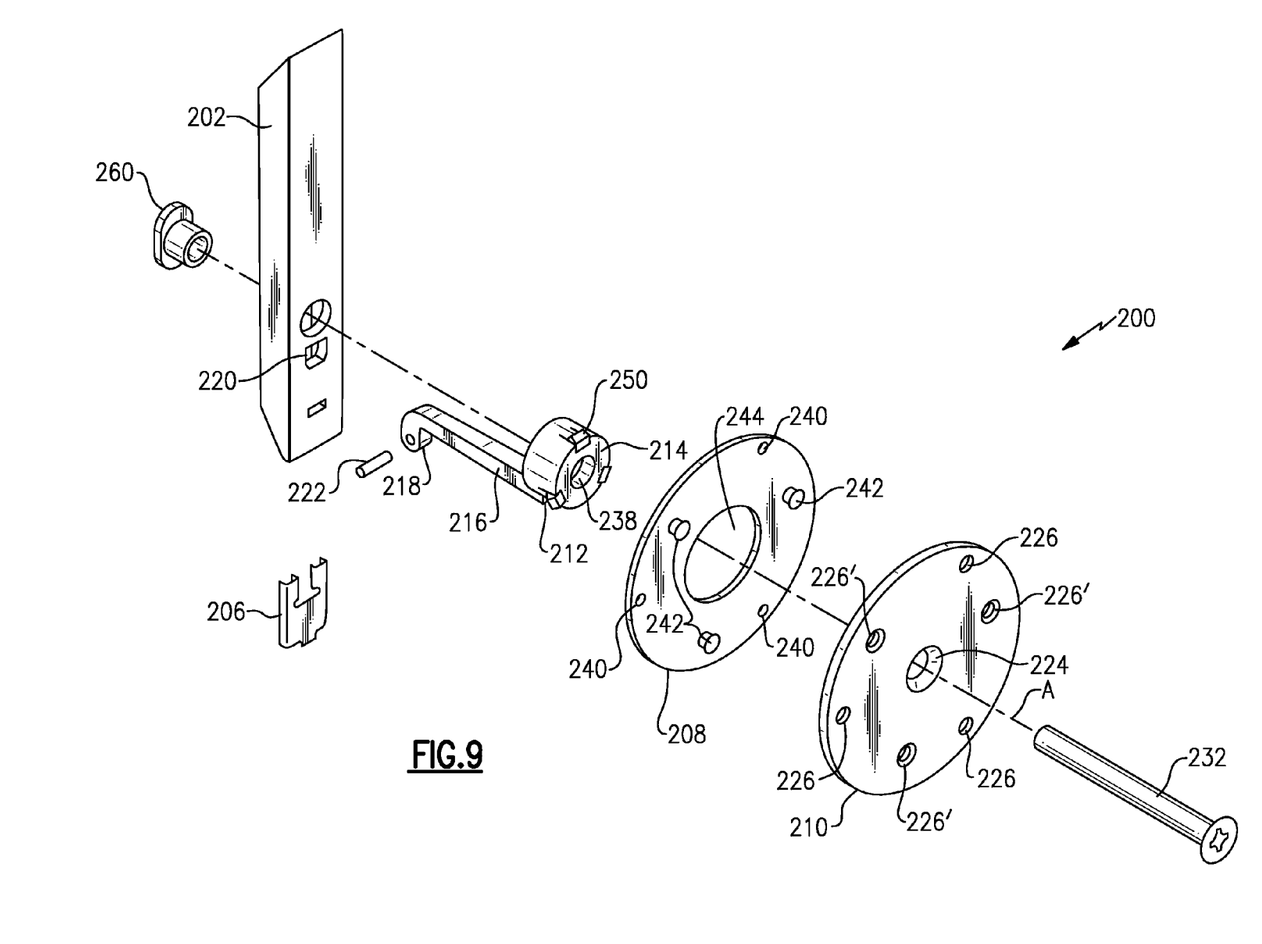
FIG. 9 is an exploded view of another example of an anchor assembly including an arm and mounting plate with multiple mount configurations.

The arm 212 includes a hub portion 214 at one end and an arm portion 216 that extends to a downwardly extending distal tip 218. The hub portion 214 includes a center opening 238. The arm portion 216 extends through a slot 220 in the vertical support beam 202 and is held in place with a pin 222 similar to that as shown in FIG. 3. The spring 206 grips opposing sides of the arm portion 216 as described above.

The mounting plate 210 comprises a generally circular shaped flange that includes a center opening 224 that defines a central axis A of the mounting plate 210. The mounting plate 210 includes a plurality of hole locations 226 that are radially spaced from the center opening 224. The mounting plate 210 is rotatable to position the hole locations 226 at a desired mount position/desired angle orientation that corresponds to a mount position of one of many different types of grab bars.

The mounting plate also includes a plurality of gasket holes 226'. The gasket 208 includes a plurality of mount holes 240 and a plurality of posts 242 that are radially spaced from a center opening 244. The posts 242 are inserted into the gasket holes 226' of the mounting plate 210 to secure the gasket 208 to the mounting plate 210. This also aligns the mount holes 240 of the gasket 208 with the plurality of hole locations 226 of the mounting plate 210. Once the mounting plate 210 is rotated to the desired position, fasteners 228 (FIG. 11) can be inserted into the hole locations 226 to secure the grab bar or accessory to the anchor assembly 200. The fasteners 228 are configured such that distal ends of the fasteners remain free from contact with a wall surface 230 when the grab bar is installed.

Thus, this configuration provides versatility such that the anchor system and mounting plate 210 can be reused with another grab bar having a different mount configuration. Further, the mounting plate 210 provides versatility in that one common anchor assembly 200 can be used with many different types of grab bars by simply rotating the mounting plate 210 to the desired orientation.

As shown in FIG. 9, a central fastener 232 is inserted through the center opening 224 in the mounting plate 210 and is threaded into the threaded insert 204 in a manner as described above to secure the mounting plate 210 to the vertical support beam 202. The gasket 208 is positioned between the wall surface 230 and the mounting plate 210 for sealing purposes.

Figure 10:
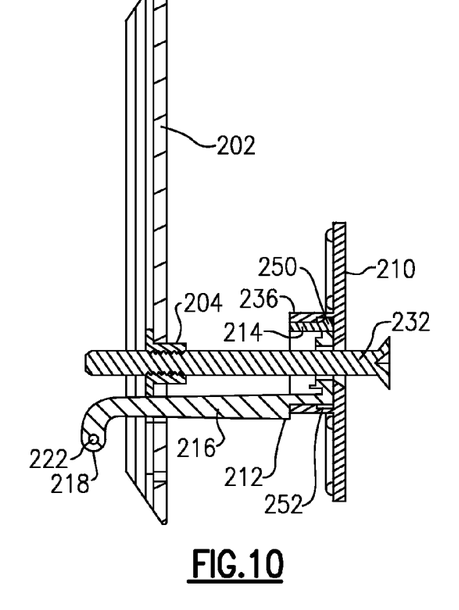
FIG. 10 is a cross-sectional view of the anchor assembly of FIG. 9 when assembled.
Figure 11:
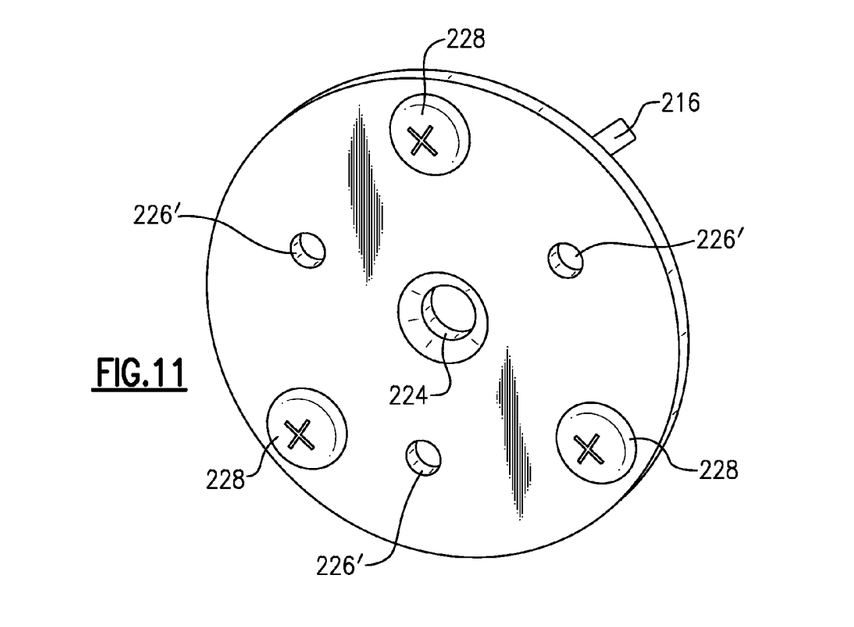
FIG. 11 is a front perspective view of the mounting plate of FIG. 10 with fasteners installed.
Figure 12:
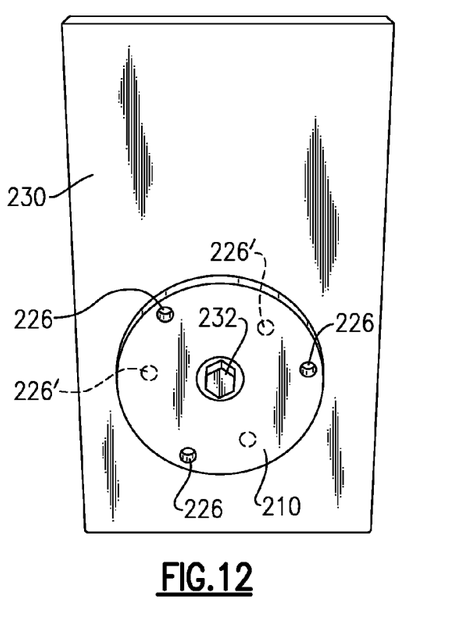
FIG. 12 is a front view of the anchor assembly of FIG. 9 mounted to a wall structure.
Figure 13:
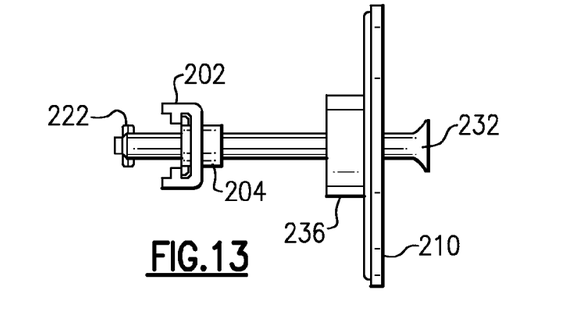
FIG. 13 is a top view of the assembly of FIG. 10.
Figure 14:
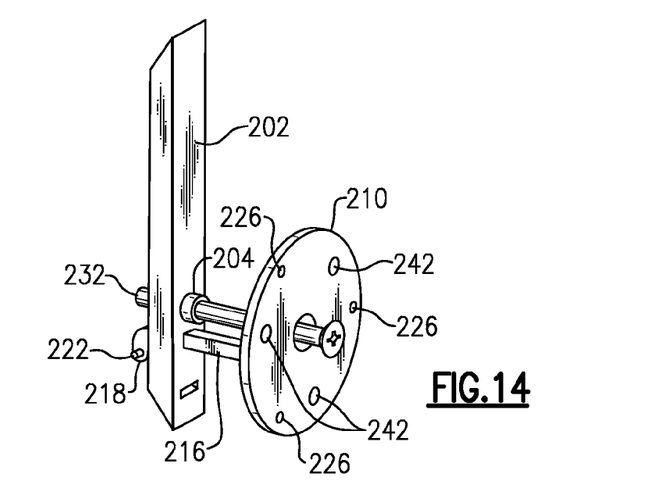
FIG. 14 is a side perspective view of the assembly of FIG. 10.
Figure 15:
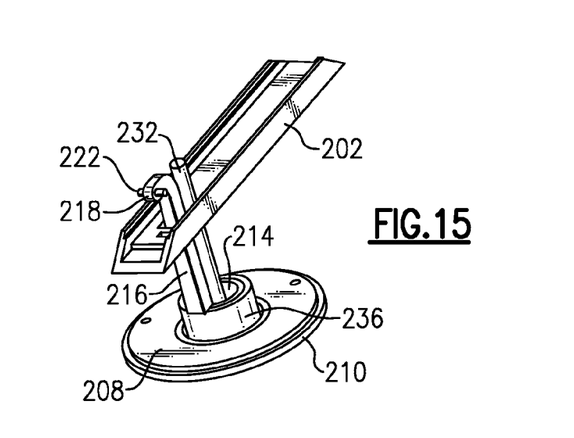
FIG. 15 is a rear perspective view of the assembly of FIG. 10.

On a rear facing side 234, the mounting plate 210 includes a tubular extension 236 that receives the hub portion 214 of the arm 212, as shown in FIG. 10. The connection between the mounting plate 210 and the hub portion 214 comprises a snap-fit connection. In one example, the hub portion includes a plurality of snap-tangs 250 that are snapped into pockets 252 formed within the tubular extension 236. This connection holds the mounting plate 210 on the arm 212 but allows the mounting plate 210 to rotate freely on the hub portion 214 to achieve the desired angular/mount position.

A method of installing the anchor assembly 200 for a bathroom grab bar or other accessory includes the following steps: The arm 212 is coupled to the vertical support beam 202. The mounting plate 210 is coupled to the hub portion 214 of the arm 212. The arm and vertical support beam are inserted through an opening in the wall surface 230. The mounting plate 210 is rotated on the hub portion 214 to position the plurality of hole locations 226 at a desired mount position, and the central fastener 232 is then inserted through the center opening 224 to secure the arm 212, mounting plate 210, and vertical support beam 202 to the wall.

Further, as discussed above, the gasket 208 and mounting plate 210 are connected to each other by inserting the posts 242 within the gasket holes 226'. Once the mounting plate 210 is rotated on the hub portion 214 to the desired mount orientation, the fasteners 228 are inserted into the plurality of hole locations 226 to secure the grab bar or accessory to the anchor assembly 200. The fasteners 228 are configured such that they do not contact the wall surface 230 once installed.

As discussed above, the mounting plate 210 is designed for use with many different types of grab bars and uses the hole locations 226 on the rotatable mounting plate to support these various types of grab bars produced by different manufacturers. The mounting plate 210 can be rotated on the arm and turned 360 degrees if necessary to allow a user to mount the grab bar at any angle. This anchor system can be used on both sides of the grab bar for dual mount purposes. Further, this anchor system allows the user to un-mount the grab bar and pull out the wall anchor from the wall without losing any parts such that the wall anchor can be reused at a different location. Also, the anchor system allows the user to upgrade or change the grab bar or accessories by simply un-mounting the bar or accessory, taking out the anchor, switching (unsnapping) the mounting plate, and reinstalling the anchor system with a new product.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An anchor assembly for a bathroom accessory comprising:
   a vertical support beam having a slot, said vertical support beam being insertable through an opening in a wall surface;
   an arm including a hub portion and an arm portion, the arm portion being insertable through the opening in the wall surface and being received within said slot;
   a mounting plate including a center opening and a plurality of hole locations spaced radially outwardly from said center opening, said mounting plate being supported by said arm and being rotatable to position said plurality of hole locations at a desired mount position;

a central fastener received within said center opening to secure said mounting plate to said vertical support beam; and a spring supported by said vertical support beam such that said spring cooperates with said arm portion to hold the anchor assembly in place during assembly, and wherein said spring includes first and second curved surfaces that engage opposing surfaces of said arm portion.

2. The anchor assembly according to claim 1 wherein said hub portion includes a connection interface to said mounting plate such that the arm and mounting plate are connected to each other but still able to rotate freely relative to each other.

3. The anchor assembly according to claim 2 wherein said connection interface comprises a snap-fit with one of said hub portion and mounting plate including a first portion that grips a second portion of the other of said hub portion and mounting plate.

4. The anchor assembly according to claim 1 wherein said mounting plate comprises a circular flange member.

5. The anchor assembly according to claim 4 wherein said plurality of hole locations comprise a plurality of threaded openings to receive fasteners for connection of the accessory to the anchor assembly.

6. The anchor assembly according to claim 5 including a gasket that is positioned between said mounting plate and the wall surface.

7. The anchor assembly according to claim 5 wherein said fasteners are configured such that distal ends of said fasteners remain free from contact with the wall surface when the accessory is installed.

8. The anchor assembly according to claim 1 wherein said mounting plate is freely rotatable on said hub portion to mount the accessory at any desired angle on the wall surface.

9. The anchor assembly according to claim 1 wherein said arm portion has a non-circular cross-section such that said arm portion cannot rotate relative to said vertical support beam.

10. The anchor assembly according to claim 1 wherein said vertical support beam includes a first end and a second end, said slot being formed adjacent said first end, and wherein said vertical support beam is movable between an initial installation position where said arm portion and said vertical support beam assume a generally horizontal position during insertion through the opening in the wall surface and a final installation position where said vertical support beam extends in a direction along the wall surface.

11. An anchor assembly for a bathroom accessory comprising:

a vertical support beam having a slot, said vertical support beam being insertable through an opening in a wall surface;

an arm including a hub portion and an arm portion, the arm portion being insertable through the opening in the wall surface and being received within said slot;

a mounting plate including a center opening and a plurality of hole locations spaced radially outwardly from said center opening, said mounting plate being supported by said arm and being rotatable to position said plurality of hole locations at a desired mount position, and wherein said mounting plate includes a tubular extension on a rear facing side;

wherein said hub portion includes a connection interface to said mounting plate such that the arm and mounting plate are connected to each other but still able to rotate freely relative to each other, said connection interface comprising a snap-fit that includes a plurality of snap-tangs formed on said hub portion that are snapped into said tubular extension;

a central fastener received within said center opening to secure said mounting plate to said vertical support beam; and a spring supported by said vertical support beam such that said spring cooperates with said arm portion to hold the anchor assembly in place during assembly.

12. An anchor assembly for a bathroom accessory comprising:

a vertical support beam having a slot, said vertical support beam being insertable through an opening in a wall surface;

an arm including a hub portion and an arm portion, the arm portion being insertable through the opening in the wall surface and being received within said slot;

a mounting plate including a center opening and a plurality of hole locations spaced radially outwardly from said center opening, said mounting plate being supported by said arm and being rotatable to position said plurality of hole locations at a desired mount position, and wherein said mounting plate comprises a circular flange member and said plurality of hole locations comprise a plurality of threaded openings to receive fasteners for connection of the accessory to the anchor assembly;

a gasket that is positioned between said mounting plate and the wall surface;

a central fastener received within said center opening to secure said mounting plate said vertical support beam; and a spring supported by said vertical support beam such that said spring cooperates with said arm portion to hold the anchor assembly in place during assembly, and wherein said mounting plate includes a plurality of gasket holes and wherein said gasket includes a plurality of posts that are received within said plurality of gasket holes to secure said gasket to said mounting plate.

13. The anchor assembly according to claim 12 wherein said gasket includes a plurality of mount holes that are aligned with said plurality of hole locations on said mounting plate.

14. An anchor assembly for a bathroom accessory comprising:

a vertical support beam having a slot, said vertical support beam being insertable through an opening in a wall surface, and wherein said vertical support beam includes a first end and a second end, said slot being formed adjacent said first end;

an arm including a hub portion and an arm portion, the arm portion being insertable through the opening in the wall surface and being received within said slot;

wherein said vertical support beam is movable between an initial installation position where said arm portion and said vertical support beam assume a generally horizontal position during insertion through the opening in the wall surface and a final installation position where said vertical support beam extends in a direction along the wall surface;

a mounting plate including a center opening and a plurality of hole locations spaced radially outwardly from said center opening, said mounting plate being supported by said arm and being rotatable to position said plurality of hole locations at a desired mount position;

a central fastener received within said center opening to secure said mounting plate to said vertical support beam; and a spring supported by said vertical support beam such that said spring cooperates with said arm portion to hold the anchor assembly in place during assembly, wherein said spring comprises a generally flat spring body with first and second upwardly turned edges formed at opposing edges of said spring body, said first and second upwardly turned edges being slidably received within corresponding first and second grooves formed within said vertical support beam, and wherein said spring includes an angled tab portion located on said spring body at a position between said first and second upwardly turned edges, said angled tab portion being received within a spring slot formed within said vertical support beam to hold said spring fixed relative to said vertical support beam.

15. An anchor assembly for a bathroom accessory comprising:
a vertical support beam having a slot, said vertical support beam being insertable through an opening in a wall surface;
an arm including a hub portion and an arm portion, the arm portion being insertable through the opening in the wall surface and being received within said slot;
a mounting plate including a center opening and a plurality of hole locations spaced radially outwardly from said center opening, said mounting plate being supported by said arm and being rotatable to position said plurality of hole locations at a desired mount position;
a central fastener received within said center opening to secure said mounting plate to said vertical support beam;
a spring supported by said vertical support beam such that said spring cooperates with said arm portion to hold the anchor assembly in place during assembly; and
a threaded insert having an eccentric base portion and a post portion with a threaded opening, said eccentric base portion being in gripping engagement with walls of said vertical support beam to prevent said threaded insert from rotating relative to said vertical support beam, and said post portion being inserted through an insert opening formed within said vertical support beam, and wherein said central fastener is threaded into said threaded opening of said post portion such that said fastener is capable of pulling said vertical support beam against a wall structure that provides the wall surface.

16. An anchor assembly for a bathroom grab bar comprising:
a vertical support beam having a first opening and a second opening axially spaced from said first opening;
a flange arm assembly including an enlarged portion with a central opening and an arm portion extending away from a rear side of said enlarged portion, said arm portion being received within said first opening;
a spring supported by said vertical support beam such that said spring cooperates with said arm portion to hold the anchor assembly in place during assembly;
an insert received within said second opening; and
a fastener inserted through said central opening and cooperating with said insert to secure the anchor assembly to a wall structure.

17. The anchor assembly according to claim 16 wherein said enlarged portion comprises a hub and said central opening comprises a hub central opening, and including a mounting plate with a plate center opening aligned with said hub central opening, said mounting plate including a plurality of hole locations spaced radially outwardly from said plate center opening, said mounting plate being supported by said arm and being rotatable to position said plurality of hole locations at a desired mount position.

18. The anchor assembly according to claim 16 wherein said enlarged portion comprises a base portion with a flange having a diameter that is configured to be larger than a diameter of an opening in a wall surface to prevent the base portion from falling through the opening.

19. The anchor assembly according to claim 16 wherein said vertical support beam is configured to be inserted through an opening in a wall surface, and said vertical support beam comprising a rigid linear body extending between a first beam end and a second beam end; and wherein said arm portion is insertable through the opening in the wall surface; and wherein said insert comprises a threaded insert that is in threaded engagement with said fastener.

20. The anchor assembly according to claim 19 including a mounting plate with a plate center opening and a plurality of hole locations spaced radially outwardly from said plate center opening, said mounting plate being supported by said flange arm assembly and being rotatable to position said plurality of hole locations at a desired mount position, and wherein said fastener extends through said plate center opening and then through said central opening of said enlarged portion.

21. The anchor assembly according to claim 20 wherein said enlarged portion includes a connection interface to said mounting plate such that the arm portion and mounting plate are connected to each other but still able to rotate freely relative to each other, said connection interface comprising snap-fit with one of said enlarged portion and mounting plate including a first member that grips a second member of the other of said enlarged portion and mounting plate.

22. The anchor assembly according to claim 20 wherein said mounting plate includes a tubular extension on a rear facing side that receives said enlarged portion.

23. The anchor assembly according to claim 20 wherein said plurality of hole locations comprise a plurality of threaded openings to receive fasteners for connection of the accessory to the anchor assembly.

24. The anchor assembly according to claim 20 including a gasket that is positioned between said mounting plate and the wall surface.

25. The anchor assembly according to claim 24 wherein said gasket includes a plurality of mount holes that are aligned with said plurality of hole locations on said mounting plate, and wherein one of said gasket and said mounting plate includes at least one male feature that is received within at least one female feature on the other of said gasket and said mounting plate.

26. The anchor assembly according to claim 19 wherein said spring includes first and second curved surfaces that engage opposing surfaces of said arm portion.

27. The anchor assembly according to claim 19 wherein said vertical support beam includes a third opening that receives a lock portion of said spring, and wherein said spring slides along said vertical support beam until said lock portion snaps into said third opening.

* * * * *

UNITED STATES PATENT AND TRADEMARK OFFICE
CERTIFICATE OF CORRECTION

PATENT NO. : 8,807,899 B2
APPLICATION NO. : 13/036085
DATED : August 19, 2014
INVENTOR(S) : William H. Spencer, Jr. et al.

It is certified that error appears in the above-identified patent and that said Letters Patent is hereby corrected as shown below:

IN THE CLAIMS:

In claim 12, column 10, line 31; after "plate" insert --to--

Signed and Sealed this
Twenty-fifth Day of November, 2014

Michelle K. Lee
*Deputy Director of the United States Patent and Trademark Office*